Aug. 25, 1936.  E. SHAY  2,052,039

VEHICLE SPRING MOUNTING

Filed Jan. 9, 1932

INVENTOR.
EDGAR SHAY.
BY
ATTORNEYS.

Patented Aug. 25, 1936

2,052,039

UNITED STATES PATENT OFFICE 2,052,039

VEHICLE SPRING MOUNTING

Edgar Shay, Pleasant Ridge, Mich., assignor to Chrysler Corporation, Detroit, Mich., a corporation of Delaware Application January 9, 1932, Serial No. 585,766

3 Claims. (Cl. 280—87)

This invention relates to an improved spring mounting particularly for supporting the spring of the front axle which is located at the steering side of the vehicle.

Heretofore, it has been the practice to shackle one end of the front spring of the steering side of a vehicle to the chassis frame and to directly pivot the other end of the spring on the chassis frame, the front axle being fixed to the intermediate portion of the spring. The front axle pivotally supports the dirigible wheels of the vehicle which have inwardly extending steering arms. The steering arm of the wheel on the steering side of the vehicle is pivotally attached to the front end of a drag link which is pivotally connected at its rear end to the chassis frame. With a structure of this kind, compression of the front spring on the steering side of the vehicle causes the end of the steering arm on the wheel of the steering side to tend to travel in an arc having as a center the pivotal axis of the end of the spring which is pivoted directly to the chassis frame. The forward end of the drag link, however, tends to travel in an arcuate course, having as its center the pivotal axis of the opposite end of the drag link. This tendency of the joined parts of the drag link and steering arm to follow different arcuate paths during compression of the spring, sets up a wheel fight which is transmitted through the steering column and steering wheel and applied on the arms of a driver in the form of jerky movements. Since the drag link is substantially non-extensible, it holds the end of the steering arm upon the arc of the drag link and causes the dirigible wheels to be turned.

The main objects of this invention are to eliminate the wheel fight and the unintentional turning of the dirigible wheels of a vehicle which results during vertical movement of the end of the front axle at the steering side of a vehicle; to provide an improved spring mounting which permits longitudinal forward and rearward movement of the axle at the steering side of the vehicle; to provide shackles at the respectively opposite ends of the front spring of the steering side of a vehicle which permit fore and aft movement of the spring; to provide improved means for holding a spring of this character which is shackled at both ends against collapsing; to provide means of this character which does not excessively stiffen the spring action to an extent which prevents absorption by the spring of comparatively small shock impulses or otherwise interfere with the sensitivity of the spring; to provide means of this character which also controls the longitudinal movement of the spring with respect to the vehicle chassis, to provide improved spring controlling apparatus which produces a longitudinal movement of the spring with respect to the vehicle chassis that has a definite proportion to the vertical movement of the axle with respect to the vehicle chassis; and to provide spring control apparatus of this character which is calibrated to move the spring of the steering side of the vehicle, together with the axle wheel, and steering arm of the wheel, rearwardly an amount which is substantially equal to the deviation between the arcs upon which the joined parts of the steering arm and drag link normally tend to travel when the front wheel at the steering side of the vehicle and the chassis frame move in a vertical course relative to each other.

An illustrative embodiment of the invention is shown in the accompanying drawing, in which.

Figure 1:
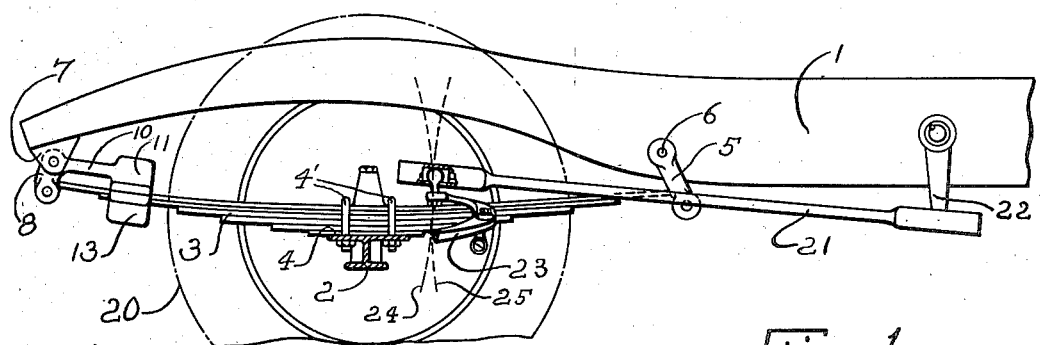
Fig. 1 is a fragmentary side elevation, partly in section, of a vehicle chassis showing the front spring of the steering side thereof and its mounting and illustrating diagrammatically the diverse paths which the joined ends of a steering arm and drag link of a conventional assembly tend to follow during relative movement of the chassis frame and axle in a vertical course.

The spring mounting illustrated in the drawing is intended to be applied only at the front end steering side of a vehicle, the remaining springs being secured to both the axles and chassis frame of the vehicle in conventional manner.

In the form shown, the front portion of the steering side of the chassis frame 1 is supported upon the front axle 2 by a leaf spring 3 which is received at its intermediate portion upon a spring seat 4 formed on the front axle 2 and firmly clamped upon the spring seat by U-bolts 4'. The rear end of the main leaf of the spring 3 is pivotally attached to a rear shackle 5 which is pivotally mounted at 6 upon the side member of the chassis frame. Fixed to the front end of the side member of the chassis frame 1 is a bracket 7 on which is pivotally mounted a front shackle 8 that is pivotally attached at 9 to the front end of the main leaf of the spring 3. This front shackle has an integral rearwardly projecting arm 10 which extends over the leaf spring 3 and on which is integrally formed an upper section 11 of a hollow barrel or housing, generally designated by the numeral 12. The barrel 12 has a detachable lower section 13 which is located below the leaf spring 3 and rigidly clamped upon the upper section 11 of the barrel by bolts 14 threaded in apertures of registering bosses 15 and 16 formed on the upper and lower sections 11 and 13, respectively, of the barrel 12. The barrel 12 has diametrically opposite openings 17 in its sides through which the spring leaf 3 extends.

Figure 2:
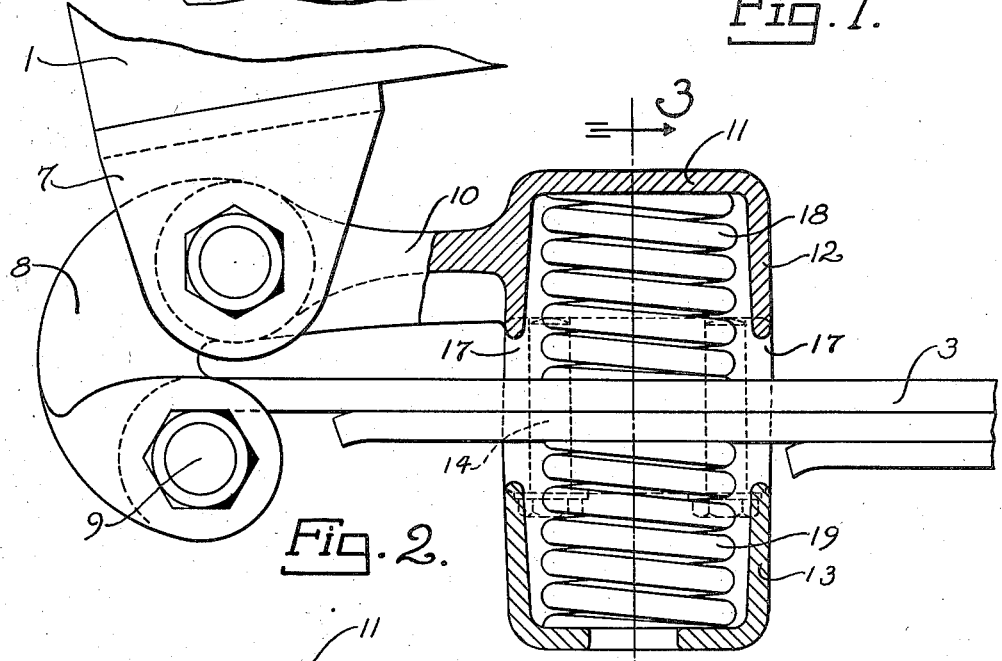
Fig. 2 is a fragmentary enlarged side elevation, partly in section, of the spring control apparatus employed in my improved spring mounting.
Figure 3:
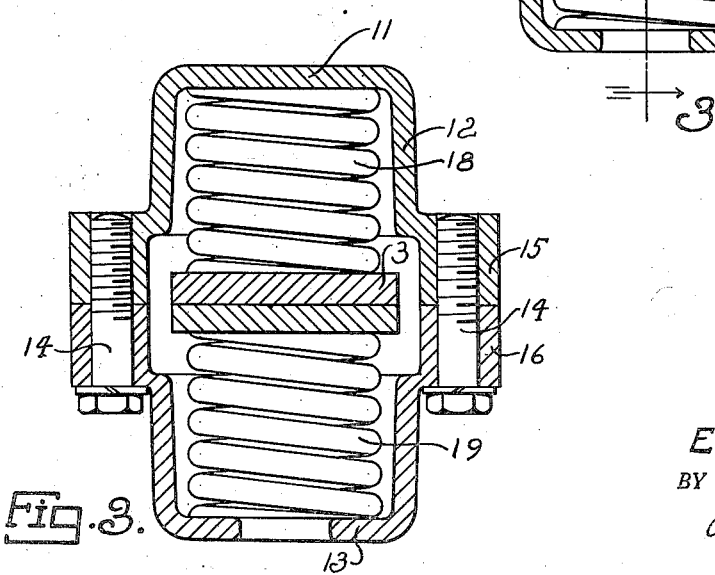
Fig. 3 is a vertical section taken on the line 3—3 of Fig. 2.

Coil springs 18 and 19 are compressed between the upper and lower sides of the leaf spring and the adjacent ends of the barrel 12, respectively, as illustrated in Figs. 2 and 3. These coil springs yieldably bear in respectively opposite directions between the arm 10 and the spring 3 and normally hold the front shackle 8 in a rearwardly inclined position helping to resist collapsing of the spring. The rear shackle 5 which is inclined forwardly causes one of the components of the weights of the sprung portion of the vehicle to be directed horizontally in a rearward direction, and the front shackle 8 which is inclined rearwardly causes another component of the weight of the sprung portion of the vehicle to be directed horizontally in a forward direction. These oppositely directed horizontal components of the weight of the sprung portion tend to straighten the spring and thereby cooperate with the coil springs 18 and 19 in holding it against collapsing.

The dirigible wheel, illustrated by dot and dash lines 20 in Fig. 1, of the steering side of the vehicle, is directly controlled by a drag link 21 which is pivotally attached at its rear end or swiveled on the lower extremity of a pitman arm 22 that is supported by the chassis frame 1. The forward end of the drag link 21 is pivotally connected, preferably by a swivel joint, to the extremity of a steering arm 23 which is rigidly attached to the wheel 20. This steering apparatus is conventionally used in vehicles of present construction and when employed in conjunction with a spring that is pivotally attached at its forward end, as is at present the practice, the end of the steering arm 23 tends to travel on an arc illustrated at 24, which has a center at the end of the spring which is directly pivoted to the frame while the forward end of the drag link tends to travel on an arc 25 which has its center located at the rear end of the drag link. The diverging relation of these arcs causes the steering apparatus to be placed under tension which results in turning of the dirigible wheels and vibration of the steering wheel.

With applicant's improved spring mounting, the leaf spring of the steering side of the front end of the vehicle is shiftable longitudinally of the frame and its longitudinal movement with respect to the frame is governed by the extension of the front shackle which is operated upon by the intermediate part of the leaf spring. When the end of the front axle 2 at the steering side of the vehicle is thrust upwardly by engagement of the front wheel of the steering side of the vehicle with a jump or irregularity in the road, the intermediate part of the leaf spring bears upwardly upon the coil spring 18 and rotates the front shackle in a counter-clockwise direction, as viewed in Figs. 1 and 2. This rotation of the front shackle 8 causes the spring 3, the end of the axle at the steering side of the vehicle and the wheel thereon, together with its steering arm, to move rearwardly a distance which is proportional to the vertical movement of the end of the axle. The control apparatus is preferably calibrated by predetermining the length of the arm 10 and the compression of the springs 18 and 19 so as to cause the unsprung portion, including the axle, wheel, and steering arm, to be moved rearwardly a distance equal to the deviation of the arcs upon which the joined parts of the drag link and steering arm would normally tend to travel if the leaf spring were held against rearward movement, as for example, by fixing the upper end of the shackle 8 to the chassis frame. This rearward movement of the end of the steering arm is therefore so proportioned with respect to the compression of the spring or vertical movement of the front axle, as to cause the joined parts of the steering arm and drag link to follow the drag link arc 25 without turning the dirigible road wheel, vibrating the steering wheel, or otherwise producing wheel fight.

Although but one specific embodiment of the invention is herein shown and described, it will be understood that various changes in the size, shape, and arrangement of parts may be made without departing from the spirit of my invention, and it is not my intention to limit its scope other than by the terms of the appended claims.

What I claim is:

1. In a vehicle, a sprung portion, an unsprung portion including an axle and a dirigible road wheel having a steering arm, steering apparatus having a drag link pivotally supported by said sprung portion and pivotally attached to said steering arm, a leaf spring extending longitudinally of said sprung portion and fixed at its intermediate part to the end of said axle at the steering side of said vehicle, a rear shackle pivoted to the rear end of said spring and pivotally mounted on said sprung portion, a bell-crank lever pivotally mounted intermediate its ends on said sprung portion and having a downwardly extending arm pivoted to the front end of said spring, the other arm of said bell-crank lever extending rearwardly over an intermediate part of said leaf spring, and yieldable means movable bodily relative to said sprung portion and bearing between the latter arm of said bell crank lever and said leaf spring, said bell-crank lever and yieldable means being so constructed and arranged to cause movement of said unsprung portion rearwardly with respect to said sprung portion of sufficient amplitude to move the end of said steering arm rearwardly an amount substantially equal to the deviation between the arcs upon which the joined parts of said drag link and steering arm tend to travel during vertical movement of the steering end of said axle.

2. In a vehicle including sprung and unsprung portions, a spring secured at its intermediate part to one of said portions, a shackle pivotally and swingingly connecting the rear end of said spring to said sprung portion, a bell-crank lever pivotally mounted intermediate its ends on said sprung portion having one of its arms extending downwardly toward and pivoted to the front end of said spring and having its other arm extending over and in the direction of the length of said spring, and a resilient member movable bodily relative to said sprung and unsprung portions and under compression between said spring and the last mentioned arm of said bell-crank lever for holding said spring against collapsing and urging said spring in one direction with a substantially constant force under diverse deflection conditions of said spring, said resilient means and bell-crank lever being so constructed and arranged as to shift said spring in the direction of its length an amount proportional to the deflection thereof.

3. In a vehicle including sprung and unsprung portions, a leaf spring secured at its intermediate part to one of said portions, a shackle pivotally and swingingly connecting one end of said spring to said sprung portion, a bell-crank lever pivotally mounted intermediate its ends on said sprung portion having one of its arms extending downwardly toward and pivoted to said spring, the opposite end of the other arm of said bell-crank lever extending over and in the direction of said spring, a casing on the free end of the latter arm having an aperture for receiving said spring and having abutment faces spaced from the upper and lower sides of said spring respectively, and coil springs movable bodily relative to said sprung and unsprung portions and bearing between said abutment faces and the upper and lower sides of said leaf spring respectively for holding the latter against collapsing, said coil springs and bell-crank lever being so constructed and arranged as to urge said leaf spring rearwardly of said vehicle with a substantially constant force under diverse deflection conditions of said leaf spring, and adapted to shift said leaf spring in the direction of its length an amount proportional to the deflection thereof.

EDGAR SHAY.